(12) United States Patent
Kim et al.

(10) Patent No.: US 9,377,635 B2
(45) Date of Patent: Jun. 28, 2016

(54) DISPLAY DEVICE CAPABLE OF DETECTING BONDING DEFECT

(71) Applicant: LG DISPLAY CO., LTD., Seoul (KR)

(72) Inventors: Bong Hwan Kim, Ulsan (KR); Byung Hwee Park, Daegu (KR); Yu Cheol Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 307 days.

(21) Appl. No.: 14/011,963

(22) Filed: Aug. 28, 2013

(65) Prior Publication Data

US 2014/0187088 A1 Jul. 3, 2014

(30) Foreign Application Priority Data

Dec. 27, 2012 (KR) .................. 10-2012-0154290

(51) Int. Cl.
*H01R 13/66* (2006.01)
*G02F 1/13* (2006.01)

(52) U.S. Cl.
CPC .................................. *G02F 1/1309* (2013.01)

(58) Field of Classification Search
CPC ................. G02F 1/1309; H01R 13/6683
USPC .............. 324/760.01, 760.02; 439/620.01
See application file for complete search history.

(56) References Cited

U.S. PATENT DOCUMENTS

| 2002/0079920 | A1 | 6/2002 | Fujikawa et al. | |
|---|---|---|---|---|
| 2005/0127936 | A1* | 6/2005 | Chen | G01R 27/205 324/760.01 |
| 2006/0017448 | A1* | 1/2006 | Chen | G01R 1/07378 324/538 |
| 2011/0304783 | A1* | 12/2011 | Park | G02B 27/2214 349/15 |
| 2012/0105085 | A1* | 5/2012 | Chen | G02F 1/1309 324/693 |
| 2012/0262886 | A1 | 10/2012 | Yamagishi | |
| 2013/0270528 | A1* | 10/2013 | Lee | H01L 51/52 257/40 |

FOREIGN PATENT DOCUMENTS

| CN | 1881010 A | 12/2006 |
|---|---|---|
| CN | 101398539 A | 4/2009 |
| CN | 10245554 A | 5/2012 |
| CN | 102749743 A | 10/2012 |
| KR | 20020034928 A | 5/2002 |
| TW | 201218143 A | 5/2012 |

OTHER PUBLICATIONS

First Office Action issued by the State Intellectual Property Office of China (SIPO) on Aug. 7, 2015.

* cited by examiner

*Primary Examiner* — Arleen M Vazquez
*Assistant Examiner* — Robert P Alejnikov, Jr.
(74) *Attorney, Agent, or Firm* — Morgan, Lewis & Bockius LLP

(57) ABSTRACT

A disclosed display device capable of detecting bonding defects includes: a display panel having an active area used to display images and a pad area in which pads are formed; driver IC (Integrated Circuit) chip mounted on a pad region of the display panel; a flexible printed circuit board bonded to the pad region of the display panel; and a bonding resistance detection circuit disposed in the driver IC chip. The display panel includes: first and second bonding portions formed in a mounting region of the driver IC chip within the pad area of the display panel; and third and fourth bonding portions formed in a bonding region of the flexible printed circuit board within the pad area of the display panel. The first through fourth bonding portions are electrically connected to one another, and the first and second bonding portions are connected to the bonding resistance detection circuit.

17 Claims, 4 Drawing Sheets

<IMAGE INSPECTION APPARATUS>

DISPLAY DEVICE CAPABLE OF DETECTING BONDING DEFECT

The present application claims priority under 35 U.S.C. §119(a) of Korean Patent Application No. 10-2012-0154290 filed on Dec. 27, 2012, which is hereby incorporated by reference in its entirety.

BACKGROUND

1. Field of the Disclosure

The present application relates to a liquid crystal display device adapted to detect a bonding defect when a driver IC (Integrated Circuit) chip and a flexible printed circuit board are bonded in a display panel.

2. Description of the Related Art

Recently, display devices, such as liquid crystal display (LCD) devices, electroluminescent display (ELD) devices, and plasma display panels, have attracted public attention due to having features of high speed response, lower power consumption and superior color reproductivity. Such display devices are being used in a variety of electrical appliances, including television receivers, computer monitors, notebook computers, mobile phones, display portions of refrigerators, personal digital assistants, automated teller machines and so on. Also, customer demands are increasing for the display devices having an input device which can be easily and simply manipulated and can minimize operational errors. To meet the increasing customer demand, a touch screen panel is proposed which allows a user to input information by directly touching the screen with his finger or a touch pen.

Small display devices include driver IC chips which are directly disposed in a pad region of a display panel in one of a COG (chip-on-glass) format and a COF (chip on film) format. The driver IC chip includes one of a gate driver circuit and a data driver circuit.

Also, signals applied from an external system to the display panel are transferred to the driver IC chips on the display panel through a flexible printed circuit board ("FPCB" or "FPC"). To this end, the flexible printed circuit board is mounted to the display panel through a FOG (FPCB-on-glass) procedure to be connected to pads formed in the display panel.

FIG. 1 is a planar view showing the structure of a display device according to the related art. FIG. 2 is a planar view illustrating a method of testing for a bonding defect in a dummy pad when a flexible printed circuit board is mounted on a display panel of the related art.

Referring to FIGS. 1 and 2, the display device includes a display panel 10, a driver IC chip DIC and a flexible printed circuit board FPC. The display panel 10 includes an active area AA 20 used to display images. The driver IC chip DIC and the flexible printed circuit board FPC are mounted on a pad area 30 of the display panel 10. Also, the driver IC chip DIC includes a gate driver circuit (not shown), a data driver circuit (not shown) and a controller (not shown). The flexible printed circuit board FPC is used to transfer supply voltages, drive signals and data signals from an external system to the display panel 10.

The flexible printed circuit board FPC is mounted in a FOG region within the pad area 30 of the display panel 10. In order to inspect a bonding defect of the flexible printed circuit board FPC, dummy pads DUMMY PAD are formed on the FOG region of the display panel 10, and bonding resistance is measured from test points TP on the flexible printed circuit board FPC in which signal patterns connected to the dummy pads are formed. Such a connection configuration is also applied to another region of the display panel 10, in which the driver IC chip DIC is mounted, in the same manner. In other words, the dummy pads are also formed on another region of the display panel 10, which includes the driver IC chip DIC, and are connected to the test points TP on the flexible printed circuit board FPC, even though it is not shown in the drawings. As such, the driver IC chips DIC adhered to a COG region within the pad area of the display panel 10 by a COG procedure can be inspected for a bonding defect.

Also, the dummy pads DUMMY PAD, which are used to measure the bonding resistances of the driver IC chip DIC and the flexible printed circuit board FPC, are electrically connected to one another by a connection pattern formed on the COG region and the FOG region, respectively, of the display panel 10. As such, the resistance of a bonding portion can be obtained from the test points TP formed on the flexible printed circuit board FPC.

Meanwhile, a microscope can be used to inspect a bonded state of the driver IC chip, which are bonded through the COG procedure, and a bonded state of the flexible printed circuit board which is bonded through the FOG procedure. However, the microscopic inspection leads to not only decreased accuracy but also a longer inspection time.

The bonding resistance measurement can be more accurate than the microscopic inspection. However, the bonding resistance measurement requires forming the test points TP using the dummy pads and bringing resistance probes in contact with the test points, for each display panel. Due to this, the bonding resistance measurement leads to a longer inspection time than the microscopic inspection.

BRIEF SUMMARY

Accordingly, embodiments of the present application are directed to a display device capable of detecting bonding defects that substantially obviates one or more of problems due to the limitations and disadvantages of the related art.

The embodiments are to provide a display device capable of detecting bonding defects that is adapted to accurately measure a bonding resistance without any inspection work by disposing a bonding resistance detection circuit, which can inspect the flexible printed circuit board and driver IC chip for a bonding defect, within the driver IC chip.

Also, the embodiments are to provide a display device capable of detecting bonding defects that is adapted to inspect a display panel for a bonding defect by disposing a bonding resistance detection circuit within a driver IC chip and confirming the bonding state of the display panel using the bonding resistance detection circuit.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a general aspect of the present embodiment, a display device includes: a display panel having an active area used to display images and a pad area in which pads are formed; a driver IC (Integrated Circuit) chip mounted on the pad area of the display panel; a flexible printed circuit board bonded to the pad area of the display panel; and a bonding resistance detection circuit disposed in the driver IC chip. The display panel includes: first and second bonding portions formed in a mounting region of the driver IC chip within the pad area of the display panel; and third and fourth bonding portions formed in a bonding region of the flexible printed circuit board within the pad area of the display panel. The first through the fourth bonding portions are electrically connected to one another, and the first and the second bonding portions are connected to the bonding resistance detection circuit.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
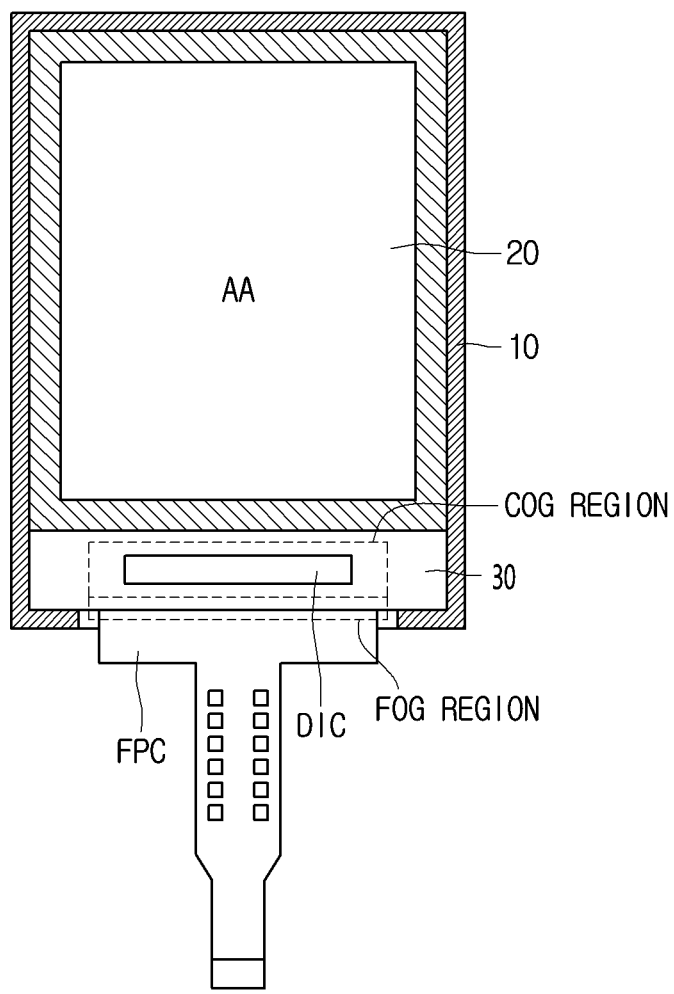
FIG. 1 is a planar view showing the structure of a display device according to the related art.
Figure 2:
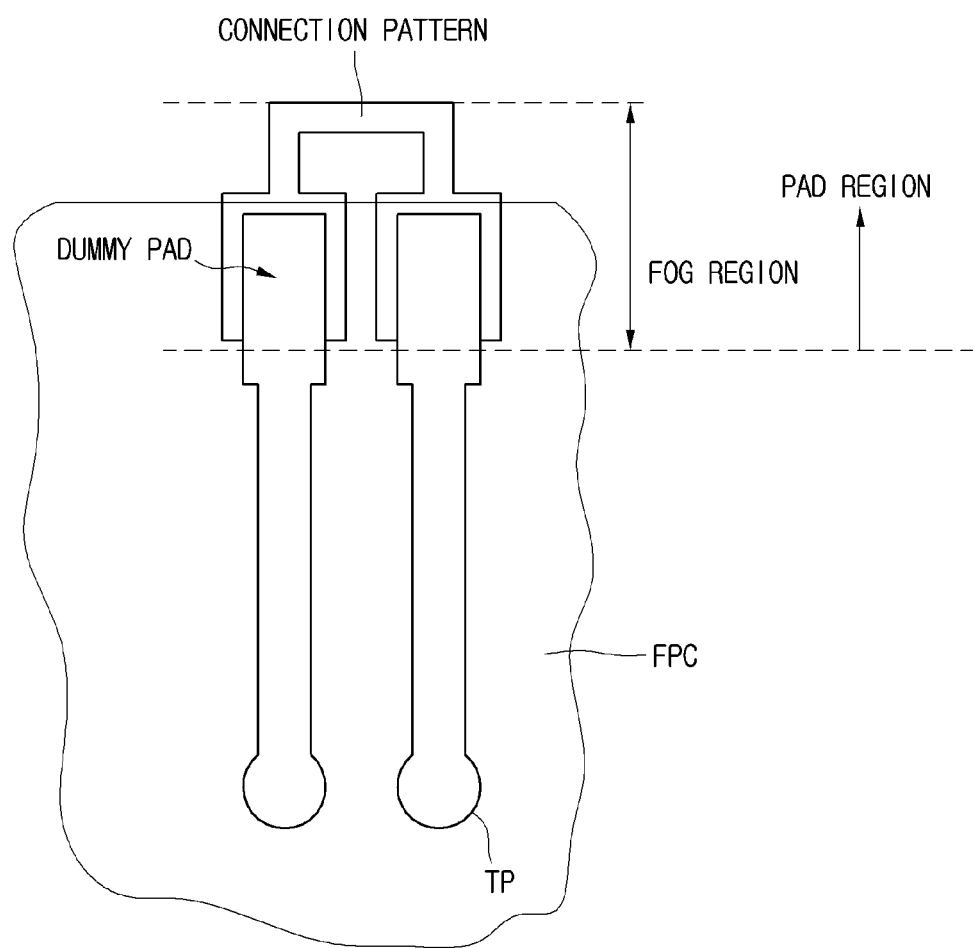
FIG. 2 is a planar view illustrating a method of inspecting for a bonding defect in a dummy pad when a flexible printed circuit board is bonded to a display panel of the related art.

Reference will now be made in detail to the embodiments of the present disclosure, examples of which are illustrated in the accompanying drawings. These embodiments introduced hereinafter are provided as examples in order to convey their principles to the ordinary skilled person in the art. Therefore, these embodiments might be embodied in a different form, and are not limited to these embodiments described here. Also, the size and thickness of the device might be exaggerated for the sake of convenience in the drawings. Wherever possible, the same reference numbers will be used throughout this disclosure including the drawings to refer to the same or like parts.

Figure 3:
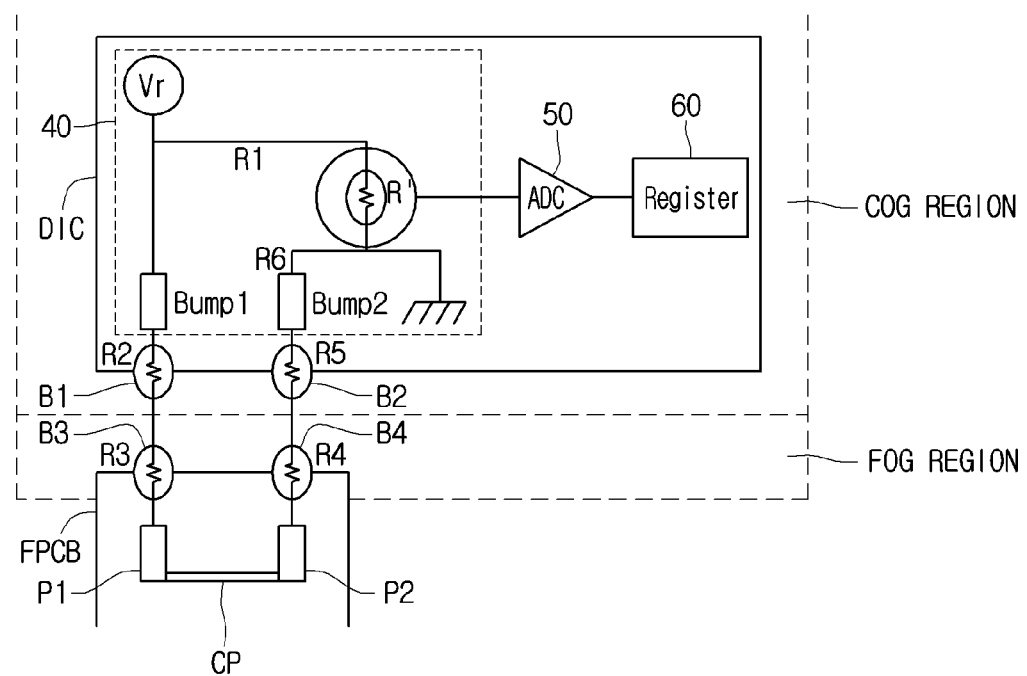
FIG. 3 is a circuit diagram showing a driver IC chip including a detector, which is configured to detect a bonding defect, according to an embodiment of the present disclosure.
Figure 4:
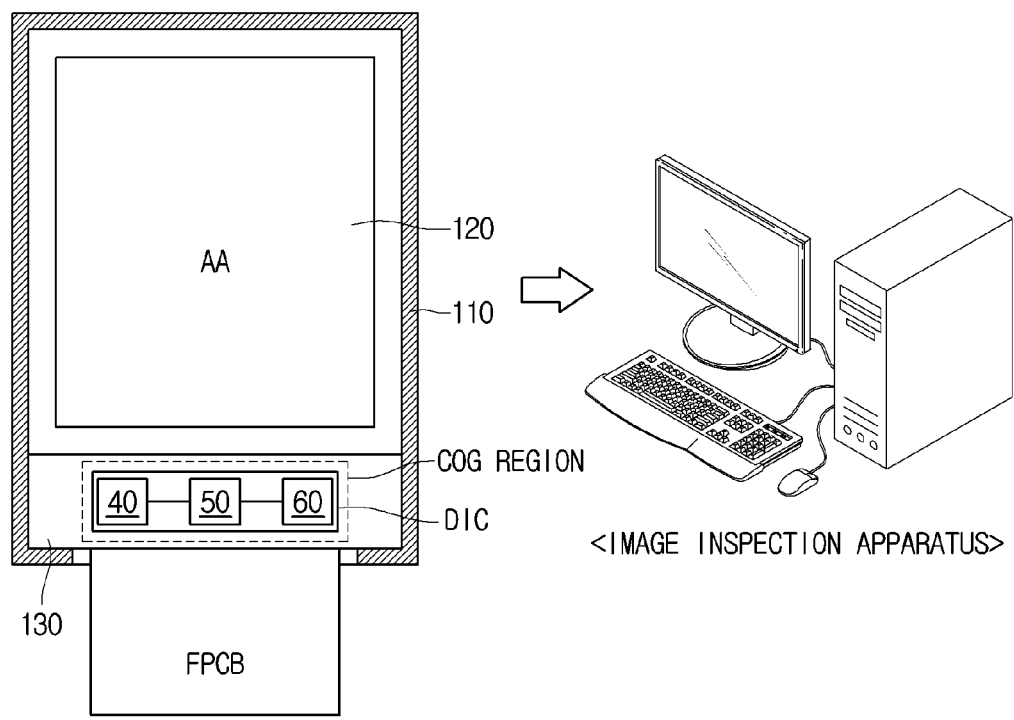
FIG. 4 is a view illustrating a method of inspecting for a bonding defect of flexible printed circuit board and a driver IC chip according to an embodiment of the present disclosure.

FIG. 3 is a circuit diagram showing a driver IC chip including a detector, which is configured to detect a bonding defect, according to an embodiment of the present disclosure. FIG. 4 is a view illustrating a method of inspecting for a bonding defect of flexible printed circuit board and a driver IC chip according to an embodiment of the present disclosure.

Referring to FIGS. 3 and 4, the display device according to an embodiment of the present disclosure includes a display panel 110 having an active area AA 120 and a pad area 130, and a flexible printed circuit board FPCB connected to the display panel 110. The pad area 130 can be divided into a COG region and a FOG region. At least one driver IC chip DIC is mounted on the COG region within the pad area.

The display panel 110 can be an LCD panel configured with a lower substrate and an upper substrate which are combined with each other and have a liquid crystal layer therebetween. The lower substrate can be defined into a plurality of pixel regions by a plurality of gate lines and a plurality of data lines crossing each other. A pixel electrode and a common electrode can be disposed in each of the pixel regions. Also, a switching element such as a thin film transistor can be disposed at an intersection of the gate and data lines. The upper substrate can include red, green and blue color filters, and a black matrix. The red, green and blue color filters can be formed opposite to the pixel regions of the lower substrate.

Alternatively, the display panel 110 can be an organic light emitting display device including organic light emission diodes. The organic light emission diodes can be formed on a substrate in which a plurality of gate lines, a plurality of data lines, power supply voltage lines and a plurality of thin film transistors are formed. Each of the organic light emission diodes can include a first electrode, an organic light emission layer and a second electrode which are formed in a pixel region of the substrate.

Also, the display panel 110 can be an electronic ink (E-Ink) film corresponding to an electrophoretic display device.

The driver IC chip DIC can include a bonding resistance detection circuit. The bonding resistance detection circuit can include a detector 40, a converter 50 and a register 60. The detector 40 can include first and second bumpers Bump1 and Bump2, a reference resistor R' and a reference voltage supplier Vr. The converter 50 can be used to convert a signal detected by the detector 40 into a digital signal. The register 60 can be used to store the digital signal converted by the converter 50.

The reference voltage supplier Vr included in the detector 40 can be an independent voltage generator. Alternatively, the reference voltage supplier Vr can be configured to derive a reference voltage from an external supply voltage. The detection signal output from the reference resistor R' can be the amount of current Ir which flows through the reference resistor R' due to the reference voltage of the reference voltage supplier Vr.

The first bumper Bump1 of the detector 40 is connected to the reference voltage supplier Vr. The second bumper Bump2 is connected to the reference resistor R'. A connection node between the second bumper Bump2 and the reference resistor R' is connected to a ground line. When the driver IC chip DIC is mounted on the display panel 110 through a COG procedure, the first bumper Bump1 is connected to a first bonding portion B1 which is formed in the COG region, and the second bumper Bump2 is connected to a second bonding portion B2 which is formed in the COG region.

One or more dummy pads connected to the first and second bumpers Bump1 and Bump2 can be respectively formed on at least one among left, right and middle portions of the mounting region of the driver IC chip DIC. As such, one or more bonding resistance detection circuits can be formed on the display panel 110. In other words, a plurality of bonding resistance detection circuits can be formed on the display panel 110.

In the display device, the flexible printed circuit board FPCB is bonded to the dummy pads (on the FOG region) of the display panel 110 through a FOG procedure, and the driver IC chip DIC is bonded to the dummy pads (on the COG region, more specifically on the mounting region of the driver IC chip) of the display panel 110 through a COG procedure. As such, the first through the fourth bonding portions B1 through B4 are formed respectively on the COG region and the FOG region within the pad area of the display panel 110. Such first through fourth bonding portions B1 through B4 must each have a resistance. The resistances R2, R5, R3 and R4 of the first through the fourth bonding portions B1 through B4 can have different values from one another according to whether a bonding defect is generated.

According to the present embodiment, the first bonding portion B1 formed on the COG region is electrically connected to the third bonding portion B3 formed on the FOG region. The second bonding portion B2 formed on the COG region is electrically connected to the fourth bonding portion B4 formed on the FOG region.

Moreover, first and second pads P1 and P2 are formed on the flexible printed circuit board FPCB. The first pad P1 is connected to the third bonding portion B3, and the second pad P2 is connected to the fourth bonding portion B4. The first and the second pads P1 and P2 are electrically connected to each other by means of a connection pattern CP formed on the flexible printed circuit board FPCB. As such, the first and the second bumpers Bump1 and Bump2, the first through the fourth bonding portions B1 through B4 and the reference resistor R' can form a closed circuit. In accordance therewith, the amount of current flowing through the reference resistor R' of the detector 40 can be detected. The amount of current can vary because the bonding resistances of the first through the fourth bonding portions B1 through B4 vary according to whether a bonding defect is generated in the COG and FOG procedures.

When the driver IC chip DIC and the flexible printed circuit board FPCB are mounted on or bonded to the display panel 110, respectively, the resistance R2 of the first bonding portion B1, the resistance R3 of the third bonding portion B3, the resistance R4 of the fourth bonding portion B4 and the resistance R5 of the second bonding portion B2 can be serially connected to one another by the connection pattern CP. Also, the resistance R2 of the first bonding portion B1, the resistance R3 of the third bonding portion B3, the resistance R4 of the fourth bonding portion B4 and the resistance R5 of the second bonding portion B2 can be connected in parallel to the reference resistor R'. This results from the fact that the reference resistor R' and the second bumper Bump2 are commonly connected to the ground line. "R1" represents a line resistance between the reference resistor R' and the reference voltage supplier Vr, and "R6" represents another line resistance between the reference resistor R' and the second bumper Bump2.

In other words, the driver IC chip DIC and the flexible printed circuit board FPCB can be bonded to the display panel 110 using the COG procedure and the FOG procedure. As such, the first through the fourth bonding portion B1 through B4 each having a resistance can be formed.

If the COG procedure and the FOG procedure are successfully completed without any process defect, the resistances R2, R5, R3 and R4 of the first through the fourth bonding portions B1 through B4 can have values within a normal range. On the other hand, when a process defect is generated during one or both of the COG and FOG procedures, at least one of the resistances R2, R5, R3 and R4 of the first through the fourth bonding portions B1 through B4 can have a higher value than the normal range.

The increased resistances of the first through the fourth bonding portions B1 through B4 due to the process defect causes the amount of current flowing through the reference resistor R' to be larger than that with a successful completion of the bonding procedures.

For example, the successful completion of the COG and FOG bonding procedures allows the resistances of the first through the fourth bonding portions B1 through B4 to be not more than 10Ω. However, when a process defect is generated in the COG and FOG procedures, at least one of the first through the fourth bonding portions B1 through B4 has a higher resistance (for example, 100Ω) than 10Ω. As such, the amount of current flowing through the reference resistor R' becomes larger than that after the successful completion of the bonding procedures. The amount of current flowing through the reference resistor R' after the successful completion of the bonding procedures depends on the reference voltage, which is generated in the reference voltage supplier Vr, and a resistance value of the bonding portion defined by specifications of the display device.

In order to inspect whether a bonding defect is or is not generated, the amount of current detected in the detector 40 of the driver IC chip DIC is applied to the converter 50. The detected amount of current is converted into a digital current value by the converter 50. The converted digital current value is stored into the register 60 which is formed within the driver IC chip DIC.

When the driver IC chip DIC and the flexible printed circuit board FPCB are bonded to the display panel 110 using the COG and FOG procedures, an image inspection process using an image inspection apparatus can be performed for the display panel 110, as shown in FIG. 4. In the image inspection process, the digital current value stored into the register 60 of the bonding resistance detection circuit is displayed by the image inspection apparatus. The bonding states of the driver IC chip DIC and the flexible printed circuit board FPCB can be confirmed by the digital current values displayed on the image inspection apparatus. The presence or absence of the bonding defects can be confirmed on the basis of the digital current values displayed on the image inspection apparatus.

The display device according to an embodiment of the present disclosure includes the bonding resistance detection circuit which is disposed within the driver IC chip DIC and measures the bonding resistance of the driver IC chip DIC and the flexible printed circuit board FPCB. As such, the display device can allow the bonding resistance to be accurately measured without any additional inspection work or process. Moreover, the display device enables the bonding state of each display panel manufactured through a manufacturing procedure to be confirmed by the bonding resistance detection circuit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
    a display panel having an active area used to display images and a pad area in which pads are formed;
    a driver IC (Integrated Circuit) chip mounted on the pad area of the display panel, the driver IC including a bonding resistance detection circuit; and
    a flexible printed circuit board bonded to the pad area of the display panel, wherein the display panel includes:
first and second bonding portions formed in a mounting region of the driver IC chip within the pad area of the display panel; and
third and fourth bonding portions formed in a bonding region of the flexible printed circuit board within the pad area of the display panel,
wherein the first through the fourth bonding portions are electrically connected to one another, and the first and the second bonding portions are connected to the bonding resistance detection circuit, and
wherein the bonding resistance detection circuit includes a detector having:
a first bumper connected to the first bonding portion;
a second bumper connected to the second bonding portion;
a reference resistor connected to the second bumper; and
a reference voltage supplier commonly connected to the first bumper and to the reference resistor.

2. The display device of claim 1, wherein the bonding resistance detection circuit further includes:
a detector configured to detect an amount of current flowing through the reference resistor;
a converter configured to convert the detected current amount into a digital data; and
a register configured to store the converted digital data.

3. The display device of claim 2, wherein the amount of current flowing through the reference resistor varies according to whether at least one of the driver IC chip and the flexible printed circuit board is defectively bonded to the pad area of the display panel.

4. The display device of claim 3, wherein the amount of current becomes larger when at least one of the driver IC chip and the flexible printed circuit board is defectively bonded to the pad area of the display panel.

5. The display device of claim 1, wherein the detector further includes a ground voltage line connected to a connection node between the second bumper and the reference resistor.

6. The display device of claim 1, wherein the third and the fourth bonding portions are connected to each other by a connection pattern formed on the flexible printed circuit board.

7. The display device of claim 1, wherein the display panel is one of a liquid crystal display panel, an organic light emitting display panel and an electronic ink (E-Ink) film.

8. A display device, comprising:
a display panel having a pad area and an active area configured to display images;
a driver IC (Integrated Circuit) chip bonded to the pad area of the display panel to form at least first and second bonding portions in the pad area of the display panel, the driver IC chip having a bonding resistance detection circuit;
a flexible printed circuit board bonded to the pad area of the display panel to form at least third and fourth bonding portions in the pad area of the display panel,
wherein the first through the fourth bonding portions are electrically connected to one another,
wherein the bonding resistance detection circuit includes a detector having a reference resistor electrically connected to the first and the second bonding portions, and
wherein the detector is configured to detect an amount of current flowing through the reference resistor.

9. The display device of claim 8, wherein the driver IC chip further includes:
a converter configured to convert the detected amount of current into a digital current data; and
a register configured to store the digital current data.

10. The display device of claim 8, wherein the detected amount of current is configured to vary based on whether there is a bonding defect in at least one of the first through the fourth bonding portions.

11. The display device of claim 10, wherein the detected amount of current is configured to be greater when there is a bonding defect in at least one of the first through the fourth bonding portions than when there is no bonding defect.

12. The display device of claim 8, wherein the detector further includes:
a first bumper connected to the first bonding portion;
a second bumper connected between the second bonding portion and the reference resistor; and
a reference voltage supplier commonly connected to the first bumper and to the reference resistor.

13. The display device of claim 12, wherein the detector further includes a ground voltage line connected to a connection node between the second bumper and the reference resistor.

14. The display device of claim 8, wherein the third and the fourth bonding portions are electrically connected to each other by a connection pattern formed on the flexible printed circuit board.

15. The display device of claim 14, wherein the flexible printed circuit board includes a first pad connected to the third bonding portion and a second pad connected to the fourth bonding portion, and
wherein the connection pattern is connected to the first pad and to the second pad.

16. The display device of claim 8, wherein the first through the fourth bonding portions are connected to each other in series, and
wherein the first through the fourth bonding portions are connected to the reference resistor in parallel.

17. The display device of claim 8, wherein the display panel is one of a liquid crystal display panel, an organic light emitting display panel, and an electronic ink film.

* * * * *